United States Patent [19]
Shortall et al.

[11] 3,783,377
[45] Jan. 1, 1974

[54] CORONA TEST DEVICE AND METHOD

[75] Inventors: John J. Shortall, Yardley, Pa.;
Calvin C. Oliver, Gainesville, Fla.

[73] Assignee: Southwire Company, Carrollton, Ga.

[22] Filed: Apr. 29, 1971

[21] Appl. No.: 138,599

[52] U.S. Cl.................................. 324/72, 324/122
[51] Int. Cl............................................. G01r 31/02
[58] Field of Search .................. 324/72, 54, 33, 32, 324/122, 71 R; 73/105

[56] References Cited
UNITED STATES PATENTS

| | | | |
|---|---|---|---|
| 1,259,696 | 3/1918 | Whitehead | 324/122 |
| 1,059,095 | 4/1913 | Whitehead | 324/122 |
| 3,173,090 | 3/1965 | Norel | 324/122 |
| 2,157,823 | 5/1939 | Hubel | 324/122 |

OTHER PUBLICATIONS

Verbon; "Electronic Design," Apr. 15, 1956; pp. 32 and 33.

*Primary Examiner*—Alfred E. Smith
*Attorney*—Jones & Thomas and Van C. Wilks

[57] ABSTRACT

A method and device for using voltages of relatively low potential to determine the relative susceptibility of an uninsulated electrical power transmission cable to the occurrence of corona and related phenomena when extra high voltages are transmitted by the cable. The method includes placing a short length of an uninsulated electrical power transmission cable with its lengthwise axis substantially parallel and relatively close to a substantially flat and relatively large plate of conductive material at ground potential, placing the short length of cable and the plate in an enclosure with air, and varying the pressure of the air and the potential of an alternating current voltage applied to the length of cable so as to cause the occurrence or extinction of corona within the enclosure at one or more combinations of pressure and potential. The device includes an enclosure having an inner surface formed by a substantially flat plate of conductive material at ground potential, mounting means for mounting a short length of an uninsulated electrical power transmission cable within the enclosure with its lengthwise axis substantially parallel and relatively close to the plate, pressure means for varying the pressure of air within the enclosure, and voltage means for applying an alternating current voltage of varying potential to the short length of cable.

12 Claims, 2 Drawing Figures

PATENTED JAN 1 1974 3,783,377

INVENTORS
John J. Shortall
Calvin C. Oliver

BY *Jones & Thomas*
ATTORNEYS

CORONA TEST DEVICE AND METHOD

BACKGROUND OF THE INVENTION

1. Field of the Invention

This invention relates to a method and device for using voltages of relatively low potential to determine the relative susceptibility of an uninsulated electrical power transmission cable to the occurrence of corona and related phenomena when the cable is used in the transmission of alternating current voltages in the extra high voltage range.

2. Description of the Prior Art

The corona and related phenomena such as radio interference voltages which occur in association with an uninsulated electrical power transmission cable are not at present fully understood as to their nature and cause. However, it is known that there is a loss in the power being transmitted by an uninsulated electrical power transmission cable when corona occurs or when the air surrounding the cable becomes ionized prior to corona occuring. Moreover, it is known that the related phenomena of radio interference voltages causes substantial and undesirable interference with electronic devices in the vicinity of the cable.

The loss in the power being transmitted by an uninsulated electrical power transmission cable because of corona or the ionization of air surrounding the cable prior to corona occurring and the radio interference voltages related to corona have long been problems in the transmission of electrical power. However, they are becoming problems of increasing importance as the potential of the alternating current voltages transmitted by uninsulated electrical power transmission cables continues to be increased in order to increase the power which may be transmitted from one point to another in a power transmission system. This is not only because the increasing potential of the alternating current voltages tends to increase the likelihood of corona and related phenomena occurring but also because the loss in the power being transmitted by an uninsulated electrical power transmission cable when corona occurs becomes of major economic significance as the potential of the alternating current voltages increases.

Thus, various laboratory methods and devices have been used in the past in an effort to obtain information concerning the nature and cause of corona and related phenomena. Most of these laboratory methods and devices have involved placing a relatively small electrical conductor within a cylindrical chamber and applying a potential difference between the electrical conductor and the cylindrical chamber to cause the occurrence of corona. In some of these laboratory methods and devices, the conductor is surrounded by conductive material within the cylindrical chamber and in others of these laboratory methods and devices, the conductor is surrounded by air or another gas within the cylindrical chamber. However, in spite of their differences, most of these laboratory methods and devices have provided some useful information concerning the nature and cause of corona and related phenomena.

In addition to the information provided by these laboratory methods and devices, information has been provided by some quality control methods and devices. These quality control methods and devices have generally been used for the testing of an insulated electrical conductor on a production basis by using the ionization of air as a means for indicating a flaw in the insulation or elsewhere in the electrical conductor. The ionization of air usually does not cause corona in these quality control methods and devices, but these quality control methods and devices are somewhat similar to the laboratory methods and devices described above in that they generally involve moving an insulated electrical conductor along the centerline of a cylindrical chamber and applying a potential difference between the electrical conductor and the cylindrical chamber.

Although these quality control methods and devices have provided some useful information concerning the nature and cause of corona and related phenomena, this information or that provided by the laboratory methods and devices described above had been of limited usefulness in the design, installation and operation of uninsulated electrical power transmission cables since it is not indicative of the susceptibility of an uninsulated electrical transmission cable to corona and related phenomena when the cable is used in the transmission of power at alternating current voltages in the extra high voltage range. This is because an uninsulated electrical power transmission cable is installed and operated under conditions which are wholly different from those provided by the laboratory methods and devices or the quality control methods and devices described above.

For example, an uninsulated electrical power transmission cable is generally not installed and operated in a cylindrical chamber with a potential difference between it and the cylindrical chamber. Rather, an uninsulated electrical power transmission cable is usually installed and operated so that it is suspended in air above the ground and it is known that the occurrence of corona and related phenomena is a function of the distance between the uninsulated electrical power transmission cable and the ground, the air surrounding the uninsulated electrical power transmission cable, and other conditions which are impractical or impossible to take into consideration in the laboratory methods and devices or the quality control methods and devices described above.

In an effort to provide information concerning the nature and cause of corona and related phenomena which is useful in the design, installation and operation of uninsulated electrical power transmission cables, use has been made of a prior art method which simulates the same conditions under which an uninsulated electrical power transmission cable is installed and operated by placing a 30 to 40 feet length of an uninsulated electrical power transmission cable at a height of 10 to 25 feet above the floor of a room and by applying a variable voltage to the length of cable to cause the occurrence of or extinguishing of corona. This prior art method provides information concerning corona and related phenomena which is useful in the design, installation and operation of an uninsulated electrical power transmission cable since the method provides information which is indicative of the relative susceptibility of an uninsulated electrical transmission cable to corona and related phenomena when the cable is used in the transmission of power at alternating current voltages in the extra high voltage range. However, this prior art method has the disadvantages of requiring a relatively large amount of space and of requiring alternating current voltages of great potential which are difficult and expensive to generate and which are hazardous to personnel in the area if a relatively expensive shielded enclosure is not provided for the personnel.

SUMMARY OF THE INVENTION

The invention disclosed herein provides information which is useful in the design, installation and operation of uninsulated electrical power transmission cables in that it provides a method and device for determining the relative susceptibility of an uninsulated electrical power transmission cable to the occurrence of corona and related phenomena. However, the invention avoids the disadvantages of the prior art method described above in that it does not require the relatively large amount of space and the alternating current voltages of great potential required by the prior art method although it provides information which is as useful in the design, installation and operation of electrical power transmission cables as that provided by the prior art method.

These improvements in a method and device for determining the relative susceptibility of an uninsulated electrical power transmission cable to corona and related phenomena are provided by utilizing a known relationship among the voltage at which corona adjacent an uninsulated electrical power transmission cable is extinguished, the distance of the uninsulated electrical power transmission cable above the ground, and the pressure of the air surrounding the uninsulated electrical power transmission cable. In one embodiment of the invention as a method, the invention includes placing a short length of an uninsulated electrical power transmission cable with its lengthwise axis parallel and relatively close to a substantially flat and relatively large plate of conductive material at ground potential, reducing the pressure of the air surrounding the cable and the plate, applying an alternating current voltage to the cable which is of sufficient potential to cause corona while maintaining the pressure of the air constant, and gradually increasing the pressure of the air until the corona extinguishes while maintaining the alternating current voltage at constant potential.

In one embodiment of the invention as a device, the device includes a relatively small substantially airtight enclosure having an inner bottom surface of conductive material at ground potential, mounting means within the enclosure for mounting a short length of an uninsulated electrical power transmission cable in a position spaced from the surfaces forming the enclosure and with its lengthwise axis substantially parallel and relatively close to the plate, pressure means for reducing the pressure of air within the enclosure, and voltage means for applying an alternating current voltage of varying potential to the short length of cable. Whether embodied in a method or a device, the invention disclosed herein requires only very little space and only alternating current voltages having potentials which are a fraction of the potentials of the alternating current voltages required in the prior art method described above. However, the invention provides for the same determination of the relative susceptibility of uninsulated electrical power transmission cables to the occurence of corona and related phenomena as that provided by the prior art method.

BRIEF DESCRIPTION OF THE DRAWING

These and other features and advantages of the invention will be more clearly understood from the following detailed description and the accompanying drawing in which like characters of reference designate corresponding parts throughout and in which.

DESCRIPTION OF EMBODIMENTS

These figures and the following detailed description disclose an embodiment of the invention disclosed herein which is a method of determining the relative susceptibility of an uninsulated electrical power transmission cable to the occurrence of corona and related phenomena and an embodiment of the invention disclosed herein which is a test device for determining the relative susceptibility of uninsulated electrical power transmission cables to the occurrence of corona and related phenomena. However, it will be understood that the invention disclosed herein may be embodied in other equivalent methods and devices without departing from the scope of the invention.

Figure 1:
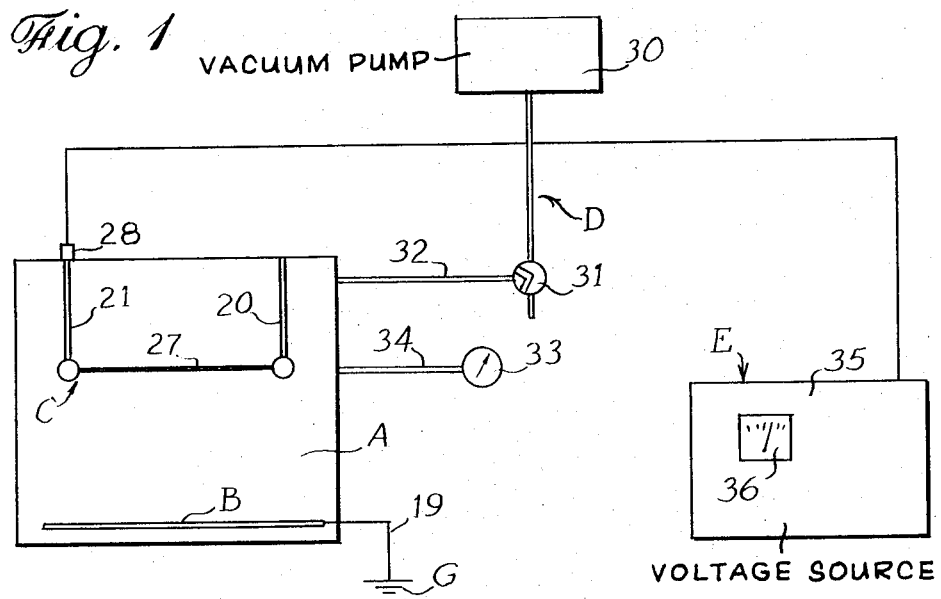
FIG. 1 is a schematic presentation of a test device which embodies the invention disclosed herein and which is suitable to practice a method embodying the invention disclosed herein.

The invention disclosed herein is most easily understood when embodied in a test device for determining the relative susceptibility of an uninsulated electrical power transmission cable to the occurrence of corona and related phenomena. The test device shown in FIG. 1 is one such embodiment of the invention and comprises a test enclosure A with a plate B at its bottom, a mounting means generally indicated as C, a pressure means generally indicated as D, and a voltage means generally indicated as E.

Figure 2:
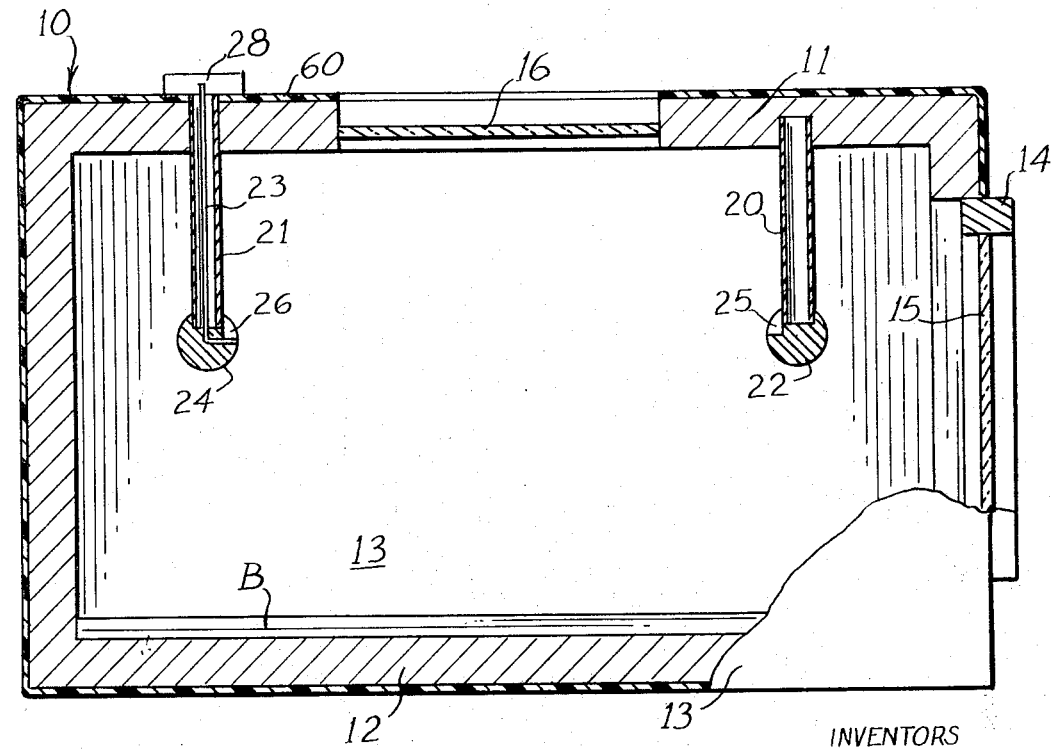
FIG. 2 is a side elevational view partial cross section of the sample box in the test device shown in FIG. 1.

The test enclosure A is provided by a sample box 10 which is best seen in FIG. 2 and which includes a top 11, a bottom 12 and side walls 13. The top 11, bottom 12 and the side walls 13 of the sample box 10 are made of plywood covered with several thin sheets 60 of plastic so as to make the sample box 10 substantially airtight when an access door 14 in one of the side walls 13 is closed. The door 14 includes a window 15 which is made of glass or transparent plastic and a smaller window 16 also of glass or transparent plastic is placed in the top 11 of the sample box 10.

The sample box 10 may be made more rigid by placing a plurality of bracing members within the sample box 10. The sample box 10 as described above is relatively inexpensive and easy to build and when constructed as described to provide a test enclosure A which is approximately 2 feet by 2 feet by 4 feet, it provides a test enclosure A well suited to the invention disclosed herein. However, it will be understood that the sample box 10 may be of any convenient material which is not electrically conductive and which will provide a substantially airtight test enclosure A of relatively small size that is accessible through an access door 15 and viewable through one or more windows 15 and 16.

The plate B is positioned on and coextensive with the bottom 12 of the sample box 10. However, it may be positioned above the bottom 12 of the sample box 10 and regardless of its position, the plate B is substantially flat, is formed of aluminum or other conductive material, and is connected by a lead 19 to ground G.

The mounting means C is for supporting a section 27 of an uninsulated electrical power transmission cable within the test enclosure A. The mounting means C includes a non-conducting support member 20 and a conducting support member 21. The non-conducting support member 20 is a rod of plastic or similar non-conductive material which is suspended from the top 11 of the sample box 10 and which has a conductive connector 22, such as a conventional corona ball, mounted at its lower end. The conducting support member 21 is a rod of plastic or similar non-conductive material which has a rod 23 of copper or similar conductive material within it, which is suspended from the top 11 of the sample box 10, and which has a conductive connector 24, such as a conventional corona ball, at its lower end.

The conductive connectors 22 and 24 are slotted at 25 and 26 to receive the ends of the section 27 of an uninsulated 27 the plate electrical power transmission cable and the rod 23 is positioned within the conducting support member 21 so that the lower end of the rod 23 is engaged by that end of the section 27 positioned within the conductive connector 24 and so that the upper end of the rod 23 extends upwardly above the top 11 of the sample box 10 to provide terminal 28. Moreover, it will be understood that the support members 20 and 21 are of a length and are positioned within the test enclosure A so that a section 27 extending between the conductive connectors 22 and 24 is spaced from the top 11, bottom 12 and side walls 13 of the sample box 10 and so that the centerline of the section 27 is spaced from and substantially parallel to the plate B.

The pressure means D is a means for controlling the pressure of air within the test enclosure A and includes a vacuum pump 30 connected through a control valve 31 to the test enclosure A by a conduit 32. The control valve 31 is a two position valve which in one position allows air to be removed from the test enclosure A by the vacuum pump 30 and in another position allows ambient air to enter the test enclosure A. The pressure means D also includes a pressure gauge 33 connected to the test enclosure A by a conduit 34. It will be understood that the pressure gauge 33 provides a continuous indication of the pressure of air within the test enclosure A and that the vacuum pump 30 and the control valve 31 will serve to change the pressure of air within the test enclosure A.

The voltage means E includes a voltage source 35 for providing an alternating current voltage at each of a plurality of potentials between zero and 20,000 volts to the terminal 28 and to a section 27 mounted between the conductive connectors 22 and 24 within the test enclosure A. The voltage source 35 may be any conventional voltage source which provides alternating current voltages within the potential range of zero to twenty thousand volts and the voltage means E includes a calibrated volt meter 36 for indicating the actual potential of an alternating current voltage applied to a section 27 by the voltage source 35.

OPERATION

A method for determining the relative susceptibility of an uninsulated electrical power transmission cable to corona and related phenomena which embodies the invention disclosed herein and the test device described above will be further understood by considering the operation of the test device described above when a section 27 of an uninsulated electrical power transmission cable is positioned between the conductive connectors 22 and 24. In the operation of the test device, the section 27 is cut from an uninsulated electrical power transmission cable and the length of the section 27 is determined by the space in between the conductive connectors 22 and 24. In a test enclosure A which is approximately 2 feet by 2 feet by 4 feet, the length of the section 27 is conveniently about 20 inches.

The section 27 is placed in position between the conductive connectors 22 and 24 through the door 14 and is conveniently about ten inches above the plate B. After the section 27 is placed in position between the conductive connectors 22 and 24, the door 14 is closed and the vacuum pump 30 in the pressure means D is operated to reduce the pressure of the air within the test enclosure A until the pressure gauge 33 indicates a reduced pressure which is approximately one-tenth the pressure of the ambient air.

When this reduced pressure of the air within the test enclosure A is indicated by the pressure gauge 33, the voltage means E is operated to provide an alternating current voltage of increasing potential through the terminal 28 to the section 27. As the potential of the alternating current voltage is increased by the voltage means E, the section 27 is observed through the windows 15 and 16 and upon the appearance of corona, the particular potential being applied by the voltage means E to the section 27 is noted from the voltmeter 36 and held constant.

Subsequently, the control valve 31 is operated to permit the gradual entry of ambient air into the test enclosure A so as to cause a gradual increase in the pressure of the air in the test enclosure A as indicated by the pressure gauge 33. As the pressure of the air in the test enclosure A increases, the corona is observed through the windows 15 and 16 and will be seen to be extinguished when a particular pressure of the air within the test enclosure A is reached.

This particular pressure of the air within the test enclosure A is noted from the pressure gauge 33 and it will now be seen that in the operation of the test device as described above, a particular potential of the alternating current voltage applied to the section 27 and a particular pressure of the air within the test enclosure A are obtained. The particular potential and the particular pressure correspond to the extinguishing of corona and may for convenience be referred to as the corona extinguishing voltage and the corona extinguishing pressure.

When the corona extinguishing voltage for a section 27 cut from one uninsulated electrical power transmission cable is compared with the corona extinguishing voltage for a section 27 cut from another uninsulated electrical power transmission cable, a determination of the relative susceptibility of the two uninsulated electrical power transmission cables to the occurrence of corona and related phenomena is provided. It will be understood a difference in the susceptibility of two uninsulated electrical power transmission cables to corona and related phenomena is caused by factors such as differences between the cables in cross sectional area and shape, stranding, and surface condition and that as a result, the difference in susceptibility to corona and related phenomena provides information concerning factors which is useful in the design, installation and operation of uninsulated power transmission cables. Moreover, it will be understood that a series of corona extinguishing voltages may be obtained for a section 27 cut from a single uninsulated electrical power transmission cable in order to determine the changes in susceptibility of the cable to corona and related phenomena caused by those different surface contaminants such as insects, airborne particulates, and condensed aerosols which must be considered in the design, installation, and operation of uninsulated electrical power transmission cables.

The corona extinguishing voltages provided by the invention can not only be considered relative to each other in order to provide information useful in the design, installation, and operation of uninsulated electrical power transmission cables, but they can also be related to an optimum corona voltage provided by Peek's law as given on page 103 of "EHV Transmission Line Reference Book," Edison Electric Institute (1968). Peek's law is for a cylindrical conductor positioned parallel to the ground and is expressed as follows:

$$V_0 = \left\{ C \frac{\rho}{\rho_0} \left[ 1 + \frac{0.3}{\sqrt{\frac{\rho}{\rho_0} R}} \right] \right\} R \ln \frac{2\Delta Z}{R}$$

where Vo is a corona starting voltage in kilovolts for a cylindrical conductor positioned parallel to the ground, $R$ is in the radius in centimeters of the cylindrical conductor, $\Delta Z$ is the distance in centimeters from the cylindrical conductor to ground, $\rho_0$ is the pressure of air at standard conditions or 29.92 inches of mercury, $\rho$ is the pressure of the air surrounding the cylindrical conductor in inches of mercury, and C is an empirical constant given the value of 30 when the cylindrical conductor is perfectly circular in cross section and has a highly polished surface.

It will be seen from examination of equation (1) that it may be used to provide an optimum corona voltage for a section 27 positioned relatively close to a plate B in air having the corona extinguishing pressure obtained by the invention disclosed herein. In this use of the equation (1), $\Delta Z$ is the distance in centimeters from the section 27 to the plate B, $R$ is the radius in centimeters of the section 27, $\rho_0$ is the pressure of air at standard conditions or 29.92 inches of mercury, and $\rho$ is the corona extinguishing pressure in inches of mercury.

The optimum corona voltage for a section 27 will differ from a corona extinguishing voltage obtained for the section 27 by the invention disclosed herein because the optimum corona voltage is a corona starting voltage rather than a corona extinguishing voltage. Moreover, the optimum corona voltage and the corona extinguishing voltage will also differ to the extend that the section 27 is not a cylindrical conductor having that perfectly circular cross section and highly polished surface which reduce susceptibility to the occurrence of corona and related phenomena and which are assumed in computing the optimum corona voltage. However, the ratio of a corona extinguishing voltage to an optimum corona voltage provides a corona ratio which is indicative of the relative susceptibility of a section 27 to corona and related phenomena. The higher the corona ratio of a section 27, the less the susceptibility of the uninsulated electrical power transmission cable from which the section 27 is cut to corona and related phenomena.

Table I shows the corona ratios obtained by the invention for sections 27 cut from nineteen different uninsulated electrical power transmission cables of the same or different radii R. Also shown in kilovolts are the corona extinguishing voltages and the optimum corona voltages on which these corona ratios are based.

TABLE I

| Cable Sample No. | Radius | Corona Extinguishing Voltage | Optimum Corona Voltage | Corona Ratio |
|---|---|---|---|---|
| 1 | 1.417 | 17.0 | 28.3 | 0.601 |
| 2 | 1.430 | 17.0 | 28.0 | 0.607 |
| 3 | 1.414 | 16.0 | 26.4 | 0.606 |
| 4 | 1.274 | 16.0 | 25.9 | 0.618 |
| 5 | 1.268 | 16.0 | 26.4 | 0.606 |
| 6 | 0.917 | 13.0 | 21.6 | 0.602 |
| 7 | 0.911 | 12.0 | 19.9 | 0.604 |
| 8 | 1.417 | 16.0 | 26.0 | 0.615 |
| 9 | 1.417 | 16.0 | 26.8 | 0.597 |
| 10 | 1.406 | 16.0 | 27.7 | 0.577 |
| 11 | 1.406 | 17.0 | 28.3 | 0.601 |
| 12 | 1.417 | 17.3 | 27.9 | 0.618 |
| 13 | 0.915 | 13.0 | 21.9 | 0.596 |
| 14 | 0.363 | 7.0 | 12.5 | 0.558 |
| 15 | 2.67 | 19.8 | 34.9 | 0.567 |
| 16 | 0.705 | 12.0 | 20.6 | 0.582 |
| 17 | 0.677 | 12.0 | 18.9 | 0.634 |
| 18 | 0.459 | 10.0 | 17.5 | 0.571 |
| 19 | 0.358 | 9.5 | 15.1 | 0.628 |

From Table I, it should be apparent that a corona extinguishing voltage indicative of the relative susceptibility of an uninsulated electric power transmission cable to corona and related phenomena can be readily obtained by the invention disclosed herein for a variety of uninsulated electrical power transmission cables without requiring those alternating current voltages of large and hazardous potentials which are required by the prior art method. Moreover, it should also be apparent that the invention requires substantially less space than the prior art method.

Since corona ratios can also be obtained for uninsulated electrical power transmission cables using the prior art method described above, corona ratios obtained for an uninsulated electrical power transmission cable by the invention and by the prior art method can be compared in order to show the relationship between the information provided by the prior art method. However, in making a comparison, it must be remembered that in the prior art method, a length of cable is suspended ten to twenty-five feet above the floor of a room in air at ambient pressure. Thus Z and $\rho$ will be large and the optimum corona voltage used with the prior art method will be substantially larger than that used with the invention disclosed herein. However, a corona extinguishing voltage obtained by the prior art method will also be substantially larger than that obtained by the invention because Z and $\rho$ are large. Accordingly, if comparable information is provided by the prior art method and the invention, the corona ratios for the same uninsulated electrical power transmission cable should be similar.

Table II below shows the corona ratios for two different uninsulated electrical power transmission cables as obtained by the prior art method and the invention. Table II also shows in kilovolts the corona extinguishing voltage and the optimum corona voltage upon which each corona ratio is based.

TABLE II

FIRST CABLE

| | Corona Extinguishing Voltage | Optimum Corona Voltage | Corona Ratio |
|---|---|---|---|
| Invention | 17.6 | 27.8 | 0.633 |
| Prior Art Method | 180 | 324 | 0.556 |

SECOND CABLE

|  | Corona Extinguishing Voltage | Optimum Corona Voltage | Corona Ratio |
|---|---|---|---|
| Invention | 16.0 | 25.1 | 0.577 |
| Prior Art Method | 135 | 324 | 0.416 |

It can be seen from Table II that the corona ratios obtained by the prior art method are similar to those obtained by the invention. Thus, it follows that a corona extinguishing voltage obtained by the invention is as indicative of the susceptibility of an uninsulated electrical power transmission cable to corona and related phenomena as a corona extinguishing voltage obtained by the prior art method. However, as is clearly shown by Table II, the corona extinguishing voltages provided by the invention are of substantially less potential than the corona extinguishing voltages in the prior art method and it is for this reason that the invention disclosed herein not only requires substantially less space than the prior art method but also requires only voltages of relatively low potential in order to determine the relative susceptibility of uninsulated electrical power transmission cable to corona and related phenomena.

It will be obvious to those skilled in the art that many variations may be made in the embodiments chosen for the purpose of illustrating the present invention without departing from the scope thereof as defined by the appended claims.

We claim:

1. In a method of determining the susceptibility of an uninsulated electrical power transmission cable to corona when said cable is used in the transmission of power, the steps of:
   1. placing a section of said cable adjacent a substantially flat conductive surface with the centerline of said section substantially parallel to said surface;
   2. reducing the pressure of a gas surrounding said section and between said section and said surface; and
   3. increasing a potential difference between said section and said surface until a corona appears adjacent said section.

2. The method of claim 1 in which said potential difference is provided by applying an alternating current voltage to said section.

3. The method of claim 2 in which said surface is at ground potential.

4. The method of claim 1 including the additional and subsequent step of maintaining said section at substantially constant potential relative to said surface while increasing the pressure of said gas until said corona is extinguished at a particular pressure.

5. In a method of determining the susceptibility of an uninsulated electrical power transmission cable to corona when said cable is used in the transmission of power, the steps of:
   placing a section of said cable adjacent a substantially flat conductive surface with the centerline of said section substantially parallel to said surface;
   reducing the pressure of a gas surrounding said section and between said section and said surface;
   increasing a potential difference between said section and said surface until a corona appears adjacent and section;
   additionally and subsequently maintaining said section at substantially constant potential relative to said surface while increasing the pressure of said gas until said corona is extinguished at a particular pressure; and
   in which said substantially constant potential is a potential whose ratio to an optimum potential is indicative of the susceptibility of said electrical power transmission cable to corona relative to a second cable having minimum susceptibility to corona because it has a perfectly circular cross section and a highly polished surface.

6. The method of claim 5 in which said optimum voltage is equal to $$\left\{ C \frac{\rho}{\rho_0} \left[ 1 + \frac{0.3}{\sqrt{\frac{\rho}{\rho_0} R}} \right] \right\} R \ln \frac{2\Delta Z}{R}$$

where $\rho$ is said particular pressure, $\rho_0$ is a standard pressure, R is the radius of said section, C is 30, and $\Delta Z$ is the distance between said section and said surface.

7. In a method of determining the susceptibility of an uninsulated electrical power transmission cable to corona when said cable is used in the transmission of power, the steps of;
   placing a section of said cable adjacent a substantially flat conductive surface with the centerline of said section substantially parallel to said surface;
   reducing the pressure of a gas surrounding said section and between said section and said surface;
   increasing a potential difference between said section and said surface until a corona appears adjacent said section;
   additionally and subsequently maintaining said section at substantially constant potential relative to said surface while increasing the pressure of said gas until said corona is extinguished at a particular pressure; and
   additionally and subsequently adding a contaminant to the surface of said section and repeating all of said steps.

8. The method of claim 4 in which all of said steps are repeated with said section replaced by a section from a second electrical power transmission cable.

9. A device for determining the susceptibility of an uninsulated electrical power transmission cable to corona when said cable is used in the transmission of power, comprising:
   1. a substantially flat plate of conductive material;
   2. mounting means for mounting a section of said cable in a position spaced from said plate and with its centerline substantially parallel to a surface of said plate;
   3. enclosure means for enclosing said mounting means and said surface of said plate in a gas at a pressure;
   4. pressure means for selectively changing said pressure of said gas; and
   5. voltage means for applying a selectively variable potential to a section of said cable mounted by said mounting means.

10. The device of claim 9 in which said plate is at ground potential.

11. The device of claim 10 in which said voltage means is a source of alternating current voltage having a potential range of from zero to twenty thousand volts.

12. The device of claim 11 in which said mounting means positions said section less than one foot from said plate.

* * * * *